US006986027B2

(12) United States Patent
Barowski et al.

(10) Patent No.: US 6,986,027 B2
(45) Date of Patent: Jan. 10, 2006

(54) UNIVERSAL LOAD ADDRESS/VALUE PREDICTION USING STRIDE-BASED PATTERN HISTORY AND LAST-VALUE PREDICTION IN A TWO-LEVEL TABLE SCHEME

(75) Inventors: Harry Stefan Barowski, Boeblingen (DE); Rolf Hilgendorf, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 09/864,590

(22) Filed: May 24, 2001

(65) Prior Publication Data

US 2002/0023204 A1 Feb. 21, 2002

(30) Foreign Application Priority Data

May 26, 2000 (EP) ................................ 00111339
May 24, 2001 (US) ................................ 09/864,590

(51) Int. Cl.
*G06F 9/34* (2006.01)
*G06F 9/44* (2006.01)

(52) U.S. Cl. ...................................... 712/240; 712/248

(58) Field of Classification Search ................ 712/220, 712/225, 240, 248
See application file for complete search history.

(56) References Cited

U.S. PATENT DOCUMENTS

| | | | | |
|---|---|---|---|---|
| 5,222,767 A | 6/1993 | Eickemeyer et al. | 395/401 |
| 5,919,256 A * | 7/1999 | Widigen et al. | 712/218 |
| 5,996,060 A | 11/1999 | Mendelson et al. | 712/205 |
| 6,516,409 B1 * | 2/2003 | Sato | 712/239 |

FOREIGN PATENT DOCUMENTS

| | | |
|---|---|---|
| JP | 63-284673 | * 11/1988 |
| JP | 2503984 | * 4/1996 |
| JP | 8-504977 | * 5/1996 |
| JP | 9-231203 | * 9/1997 |
| JP | 11-272466 | * 10/1999 |

OTHER PUBLICATIONS

Path-Based Next Trace Prediction; Jacobson, Q., Rotenberg, E., Smith, J.E.; Dec. 1-3, 1997; Microarchitecture, 1997; pp. 14-23.*

"Highly Accurate Data Value Prediction Using Hubrid Predictors", K. Wang et al., Proceedings of the 30th Annual ACM/IEEE International Symposium on Microarchitecture, IEEE, 1997, pp. 281-290.

"Global Context-Based Value Prediction", T. Nakra et al., Proceedings of the Fifth International Symposium on High-Performance Computer Architecture, IEEE, 1999, pp. 4-12.

(Continued)

*Primary Examiner*—Daniel H. Pan
(74) *Attorney, Agent, or Firm*—Lynn L. Augspurger, Esq.; Kevin P. Radigan, Esq.; Heslin Rothenberg Farley & Mesiti, P.C.

(57) ABSTRACT

This invention is a method and system for hybrid prediction of load addresses and/or values. The new scheme for value prediction provides prediction based on last values and strides, as well as context prediction, without the use of a sophisticated switching scheme between several predictors. The system collects patterns of deltas of subsequent values instead of the values itself in a first table. Thus, a last value prediction can be achieved by predicting a 'pattern' of just one stride equal to zero. A stride predictor uses a pattern of one constant stride. And a certain pattern of values is modeled by recording the pattern of deltas between the values and adding the deltas to the last value. The switching scheme is inherently included in the system itself and operates basically by immediate evaluation of counters in the pattern history table.

9 Claims, 6 Drawing Sheets

OTHER PUBLICATIONS

"Value Prediction for Speculative Multithreaded Architectures", MICRO-32, Proceedings of the 32nd Annual ACM/IEEE International Symposium on Microarchitecture, IEE International Comp. Soc., 1999, pp. 230-236.

"The Predictability of Data Values", Y. Sazeides et al., Proceedings of the 30th Annual ACM/IEEE International Sympsium on Microarchitectures, IEEE Comp. Soc., 1997, pp. 248-258.

"Architecture of the Atlas Chip-Multiprocessor: Dynamically Parallelizing Irregular Applications", L. Codrescu et al., IEEE Transaction on Computers, vol. 50, No. 1, Jan. 2001, pp. 67-82.

* cited by examiner

UNIVERSAL LOAD ADDRESS/VALUE PREDICTION USING STRIDE-BASED PATTERN HISTORY AND LAST-VALUE PREDICTION IN A TWO-LEVEL TABLE SCHEME

PRIOR FOREIGN APPLICATION

This application claims priority from European patent application number 00111339.8, filed May 26, 2000, which is hereby incorporated herein by reference in its entirety.

TECHNICAL FIELD

The present invention relates to performance improvements in superscalar computer systems. In particular, it relates to an improved method and system for hybrid address prediction.

BACKGROUND OF THE INVENTION

To achieve higher performance most microprocessors are designed as superscalar processors having multiple execution units. The idea behind this concept is to increase instruction level parallelism further referred to herein as ILP. Because most instructions show dependencies which would lead to stalls in the processor's pipeline(s) until the dependency is resolved register renaming in combination with out-of-order execution allows improvements of ILP. Nonetheless a lot of dependencies still remain and prevent multiple instructions from being executed in parallel which leads to bubbles in the pipeline.

To increase efficiency and to overcome the bubbles in the pipeline load address or value prediction can help to avoid pipeline stalls, because even dependent instructions can be executed using speculatively calculated data. If it turns out that the predicted value was wrong the corresponding instructions must be re-executed which represents a performance reducing penalty.

To reduce the penalty for mispredicted values it is a) necessary to provide best possible load address/value prediction and b) necessary to determine the instructions whose operands can be predicted with high confidence and which cause low penalty even if the predicted address/value was wrong.

In particular, prior art value prediction can be separated into three categories: Load address prediction, prediction of source register values and prediction of target register values.

The simplest algorithm used in prior art value predictors is based on the assumption that the contents of memory locations and registers remains mostly unchanged. So, an appropriate prediction scheme is simply to predict the last value. The so-called last value predictor, further referred to herein as LVP, as depicted preferably in FIG. 1, comprises a table 10 which is addressed by hashing 12 of the instruction address with each entry consisting of a tag field 14 and a last value field 16.

The table is most likely organized as n-way set associative (e.g. n=4). If a match is found by determining that the tag field matches the instruction address, then the corresponding last value from this table entry is used for prediction. If there is no match, a new entry is made, replacing the Least Recently Used (LRU) table entry as determined by an LRU algorithm.

Regardless, the predictor is updated each time with the correct value, if it is confirmed.

Another prior art scheme is a simple extension of the LVP, as it is depicted in FIG. 2.

Two additional fields, the stride field 20 and a status field 22 are added to each table entry. The idea behind this predictor is that often memory contents are changed by a certain delta value, i.e. a stride. Thus, the next predicted value can be calculated by simply adding the stride to the last value. The status field is used to determine whether the predictor should predict the last value or the last value increased by a certain stride. So the stride predictor further referred to herein as SP is involved only if a certain stride could be found and confirmed as indicated by the status field.

If the stride predictor fails after some successful predictions it will switch back to last value prediction (switching the status field back to LVP) unless a new stride is found and confirmed.

The stride predictor, further abbreviated herein as SP is updated every time with the most current value. If the stride changes it is used only if the new stride is confirmed, i.e. when the same stride is found the next time again.

It should be noted that such a confirmation is advantageously done when the same stride reoccurs at least twice subsequent to each other.

Although the LVP and SP methods can achieve correct prediction rates of up to more than 50%, for certain cases there are still some instructions which alter the contents of memory locations according to a particular pattern which is repeated several times. Therefore, values can be predicted out of such a context and a context predictor, further referred to herein as CP has been proposed as well.

Whereas the SP is an extension of the LVP, the context predictor (CP) is based on a two-table lookup and thus consists of two tables as is illustrated in FIG. 3.

The entries in the first table 30, which is organized as n-way set associative, each comprise a tag field 14, several (e.g. four) last value fields 31*a*–31*d*, a LRU field 32 and a value history pattern field 33. An entry is selected via hashing 12 of an instruction address. If no match is found, a new entry is added to the table replacing the least recently used table entry according to the LRU field. Specifically, the step of adding a new entry comprises: writing the tag information—e.g. the instruction address—in the tag field; writing the current result produced by the instruction in one of the value fields 31*a*–31*d*, and initializing the value history pattern stored in fields 33.

The value history pattern describes the history of the last several (e.g. six) values of the selected memory location used in a series whereby each of the value fields 31*a*–31*d* is identified by a two bit pattern. '00' refers to the value stored in the value field 0, '01' refers to the value stored in the value field 1, etc. For example, if the six most recently used values of a certain instruction were placed in value fields 0,1,2,0,3,2 the corresponding value history pattern (VHP) is '00 01 10 00 11 10'. The LRU field stored in each table entry determines which value field is overwritten if a new value is detected for that instruction.

The two-table lookup is executed by using the VHP (e.g. a 12-bit pattern) as an address to select an entry in the second table, the pattern history table 34, further referred to herein as PHT. Preferably, the second PHT table may have a number of 4K entries in conjunction with the 12-bit pattern used to address this table.

An entry in the PHT table comprises four saturating 4-bit counters 35*a* to 35*d*. These counters represent each value field 31*a* to 31*d* in the first table 30. The counter with the highest value and with a count higher than a threshold value selects the appropriate last value stored in the first table. The counters in the PHT are updated according to the current value, i.e. the corresponding counter is increased by a certain number (e.g., 3) whereas the other counters are decreased by a certain number (i.e. 1). The counters saturate (e.g. by 0 resp. 12), and the threshold value (e.g., 6) is chosen to determine whether a prediction can be made or not.

The second update procedure comprises updating the VHP 33. Specifically, the VHP 33 is shifted left two bits and the vacant two bits on the right are filled with the bit pattern corresponding to the current value. If the value was not already stored in one of the 'last value fields', the current value replaces the least recently used last value stored in one of the four value slots and the corresponding two-bit pattern is placed into the VHP 33.

Whereas such a context predictor predicts certain repeating patterns of values—here patterns consisting of up to four different values—it is not effectively predicting strides or last values. Therefore, the best value prediction can be achieved by combining the CP with the LVP/SP. This 'combined' predictor is often called a hybrid predictor (HP). It uses a switching scheme to select the predictor of choice in order to achieve the best reliability.

An advantage of the hybrid predictor is that is saves latch counts for using the SP for last value and stride predictions. The major drawback, however, is the complex underlying switching scheme which is necessary in prior art to decide whether to use the LVP or the SP or the CP. According to prior art it is preferred to start the prediction with the LVP. If the LVP is not successful, but a stride could be found and confirmed, then the SP is invoked. If no stride could be determined, then the CP is initialized and starts collecting and confirming the pattern—assuming that there is a certain pattern of values.

If the pattern stabilizes, i.e., the counters in PHT 33 reach the threshold value, predictions can be made out of context. If the predictor fails, the switching scheme re-enables the LVP. The disadvantage is, however, that the context predictor invocation is rather inefficient because it takes rather long until the CP is really used because prior to issuing a context prediction the data must be collected which are the basis for a reliable CP.

SUMMARY OF THE INVENTION

It is thus an objective of the present invention to provide for a prediction scheme which supports value prediction, stride prediction and context prediction with reduced storage requirements and with a better performance when switching between said different kinds of predictors.

This objective of the invention is achieved by the features stated in the independent claims. Further advantageous arrangements and embodiments of the invention are set forth in the respective dependent claims.

The present invention discloses a new load address/value prediction scheme which combines the advantages of the three prior art prediction schemes LVP, SP, and CP described above.

Said new scheme for value prediction provides prediction based on last values and strides, as well as context prediction, without the use of a sophisticated switching scheme between several predictors. Thus, a quite 'universal' prediction (UP) scheme is disclosed which is based on the two-table lookup mechanism of the context predictor but which deals with differences between subsequent values stored in a certain memory location.

The prediction system of the present invention collects patterns of deltas, i.e., the differences between values, of subsequent values instead of the values themselves. Thus, a LVP can be achieved by predicting a 'pattern' of just one stride equal to zero. A stride predictor uses a pattern consisting of just one (constant) stride. And a certain pattern of values is modeled by recording the pattern of deltas between the values and adding the deltas to the last value.

As the context prediction is based on the deltas, i.e., the differences between some values, the predictor is also capable of predicting values which show a certain pattern of changes. This is thus more general than just recording a certain pattern of values. The main advantage of the context predictor of the present invention is that it inherently involves the switching scheme, i.e., if a certain counter reaches a hit-threshold value, the prediction out of context, including stride prediction, as well as last value prediction is started.

According to a preferred embodiment thereof the default and initial prediction method is LVP by using a stride equal to zero. This can be achieved by initializing the corresponding counter to the threshold value. If the value is not predictable at all, this counter will be decreased below the threshold and the new status 'not predictable' will be recognized and can be issued. This is a remarkable advantage compared to prior art because the performance penalty due to a misprediction recovery can be remarkably higher than waiting until the dependency is resolved and the result is calculated in an ordinary manner.

If the last value prediction or the stride prediction is correct the predictor will immediately start using these prediction schemes. If no stride could be found but a pattern can be detected instead, the predictor has already begun with collecting and confirming this pattern and will start using the context prediction mechanism as soon as possible.

The predictor thus saves array counts, because the strides stored in the stride fields may have a restricted number of bits compared to the last value stored in the CP. This is true despite the fact that the last value must be stored in an additional field in each entry. Assuming that the values to predict are 64 bits wide and that a stride field consisting of 16 bits is sufficient, four stride fields and the last value field together will consume 128 bits, whereas the CP with four last values stored in each entry will consume as much as 256 bits.

Advantageously, the number of stride fields is greater than 3 and smaller than 7 for application in today's modern computer architectures.

BRIEF DESCRIPTION OF THE DRAWINGS

The present invention is illustrated by way of example and is not limited by the shape of the figures of the accompanying drawings in which.

BEST MODE FOR CARRYING OUT THE INVENTION

Figure 4:
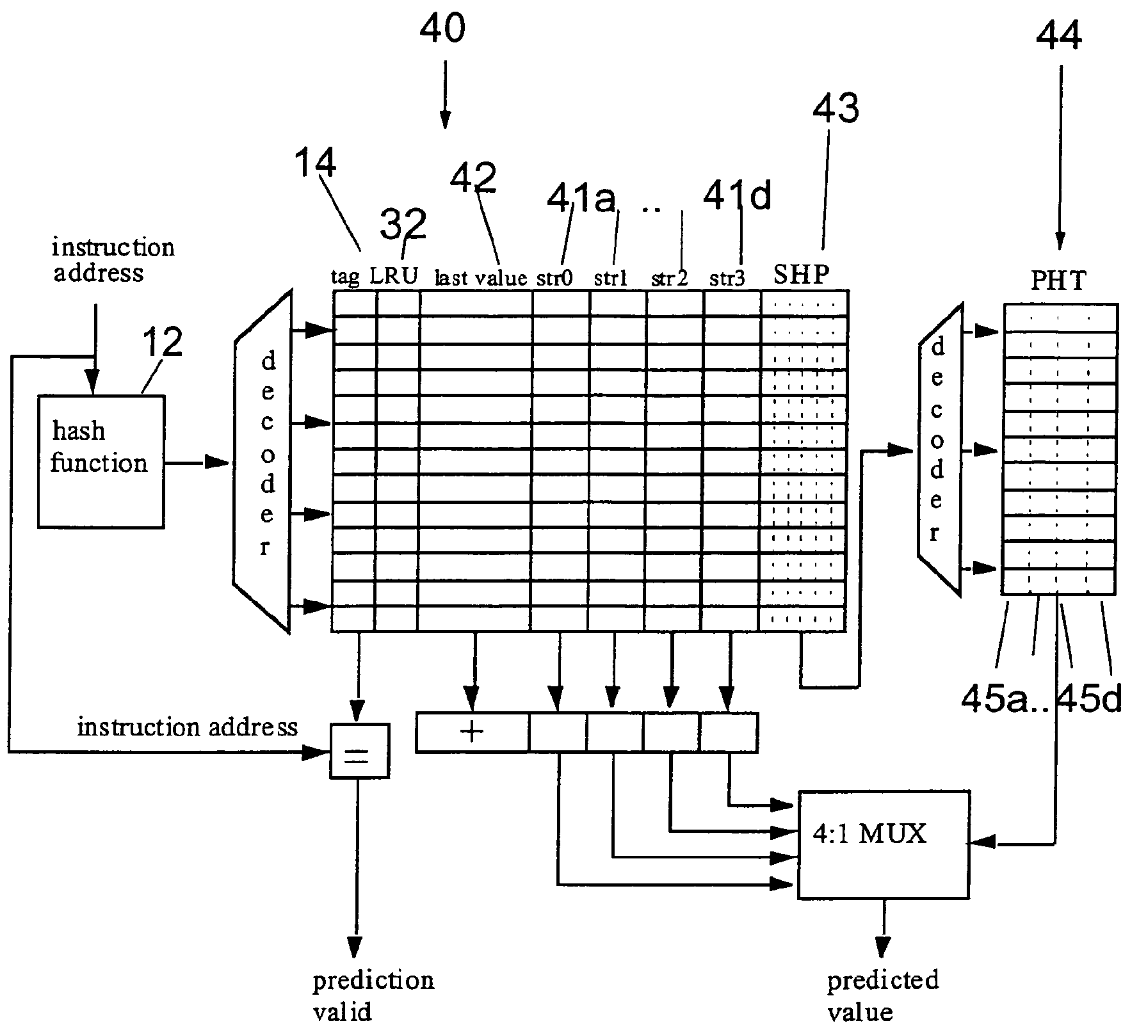
FIG. 4 is a schematic block diagram showing the essential components used in a hybrid predictor according to a preferred embodiment of the present invention

With general reference to the figures and with special reference now to FIG. 4, the essential components used in a hybrid predictor according to a preferred embodiment of the present invention, which is referred to herein below as 'universal predictor' (UP), are described in more detail below, by way of example, for the prediction of instruction addresses having 64 bits.

The UP is a two-level predictor comprising two tables 40 and 44. The entries in the first table 40, which is organized as 4-way set associative, comprise: a (prior art) tag field 14, (32 bit long); a LRU field 32, 6 bit long, depending on the number of stride fields in use, a last value field 42, 64 bit long, four stride fields 41*a* to 41*d*, each 16 bit long, and a stride history pattern (SHP) field 43, (6 times 2 bits=12 bits long).

An entry of table 40 is selected via hashing 12 of the instruction address. If no match is found, a new entry is added to table 40 replacing the least recently used entry according to the LRU field. There is a 6-bit pattern for each hashing address which keeps track of the LRU table entry in table 40.

When a new instruction occurs the first time during an operation, no stride will be known for it, and a new entry must be added. This step comprises: writing the tag info, i.e., the instruction address, into the tag field 14; writing the current value in the last value field 42; writing stride=0 into one, e.g., the first, of the four stride fields 41*a*, . . . 41*d*; and initializing the stride history pattern, by e.g. '00 00 00 00 00 00', if stride=0 is written into the first stride field. Thus, the next time, at most a stride=0, i.e., the last value can be predicted. When a stride not equal to 0 turns out to be true, than some delta exists, and LVP turns out not to be adequate. This delta can be taken as the stride for future prediction by replacing the former stride=0 in the str0 field 41*a*.

The stride history pattern describes the history of the last six strides used in series where each stride is identified by a two bit pattern, e.g., '00' for the stride placed in the stride field 0, '01' for the stride placed in stride field 1, and so on. When for example the six recently used strides were placed in stride fields 0,1,1,0,3,2 then the stride history pattern (SHP) would be 00 01 01 00 11 10.

A second LRU value stored in the LRU field 32 of each table entry determines which stride in the stride fields has to be replaced if more than 4 strides are needed and the least recently used stride is replaced.

Figure 1:
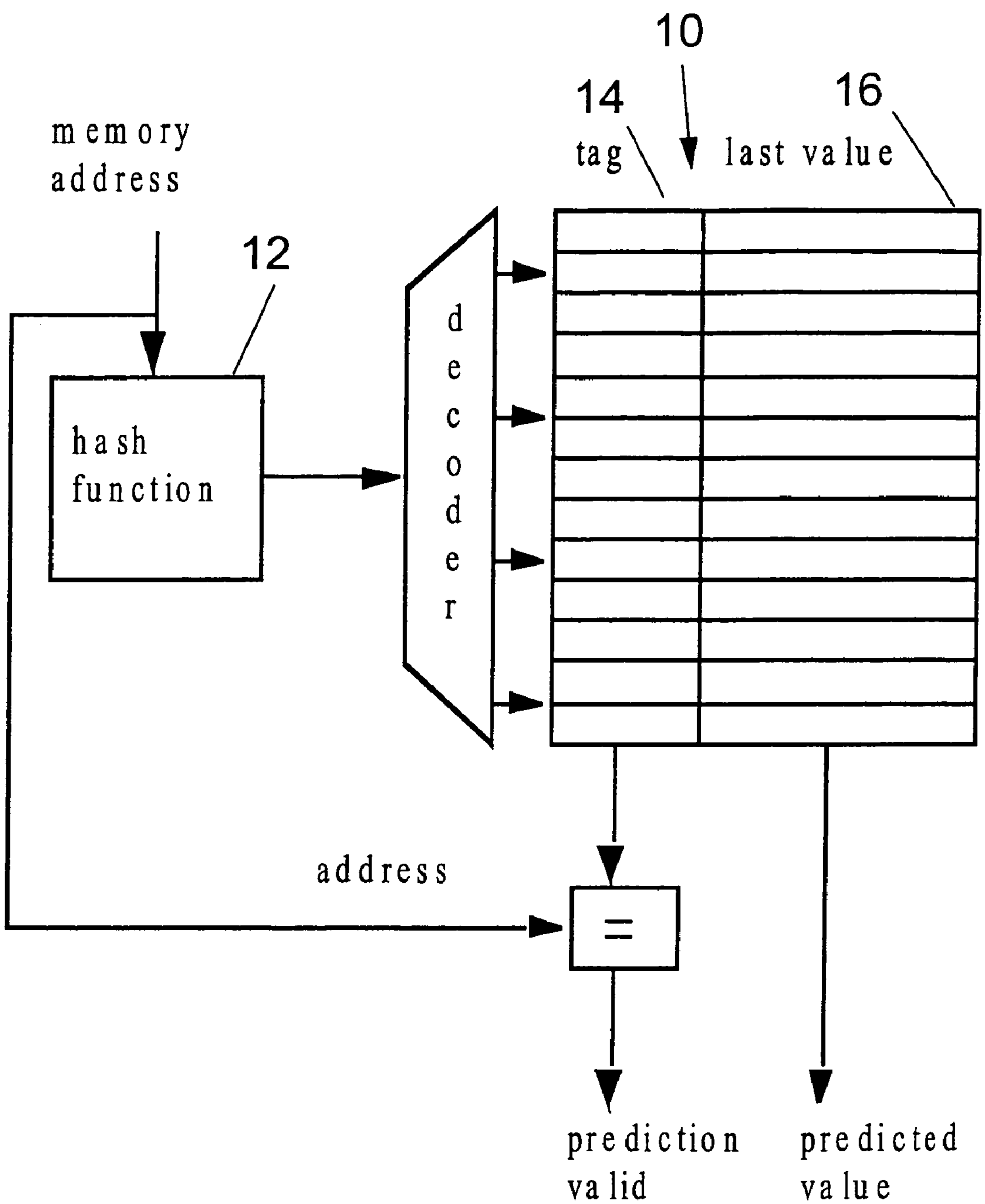
FIG. 1 is a schematic block diagram showing the essential components used in a prior art last value predictor.
Figure 2:
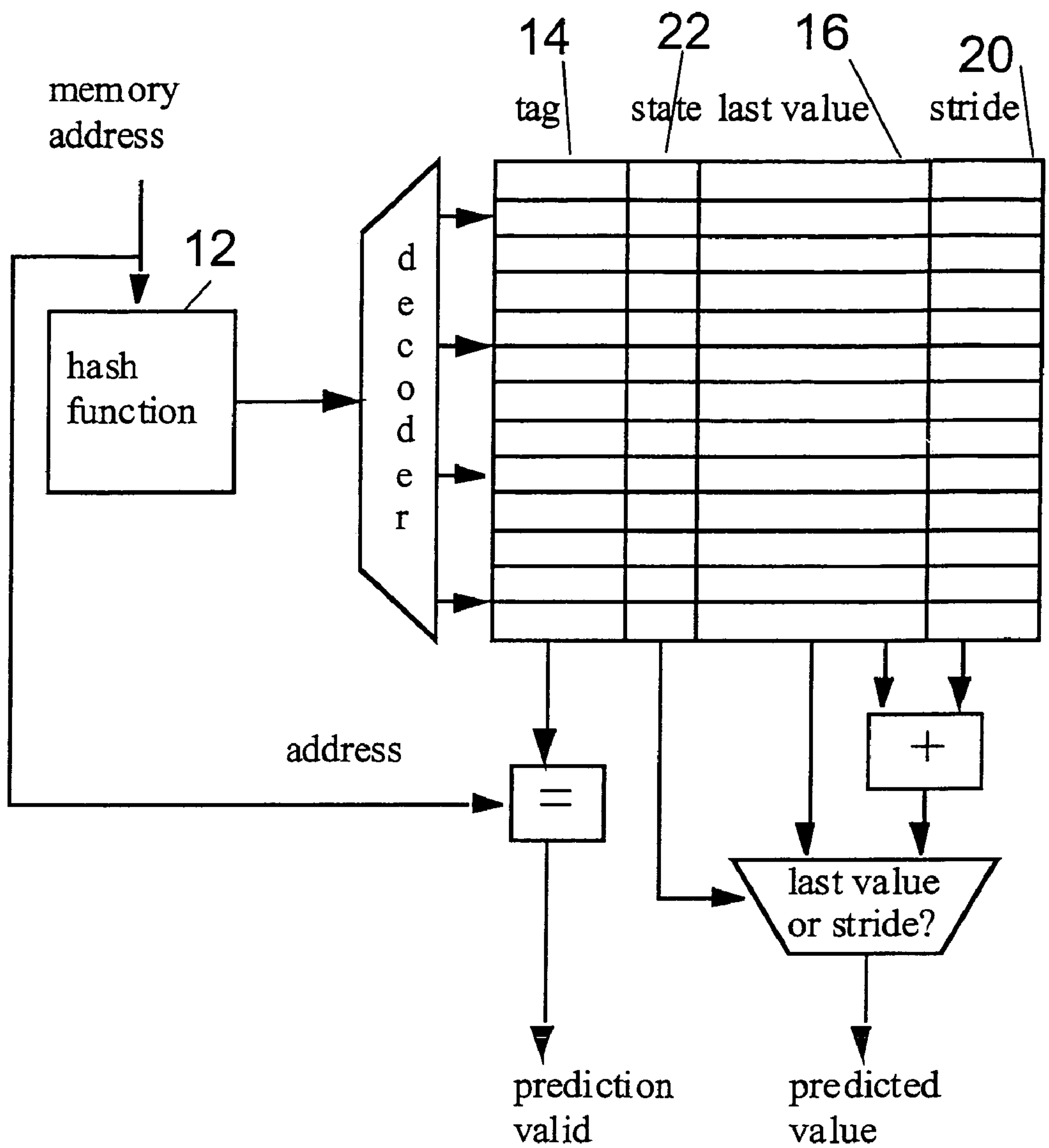
FIG. 2 is a schematic block diagram showing the essential components used in a prior art stride predictor.
Figure 3:
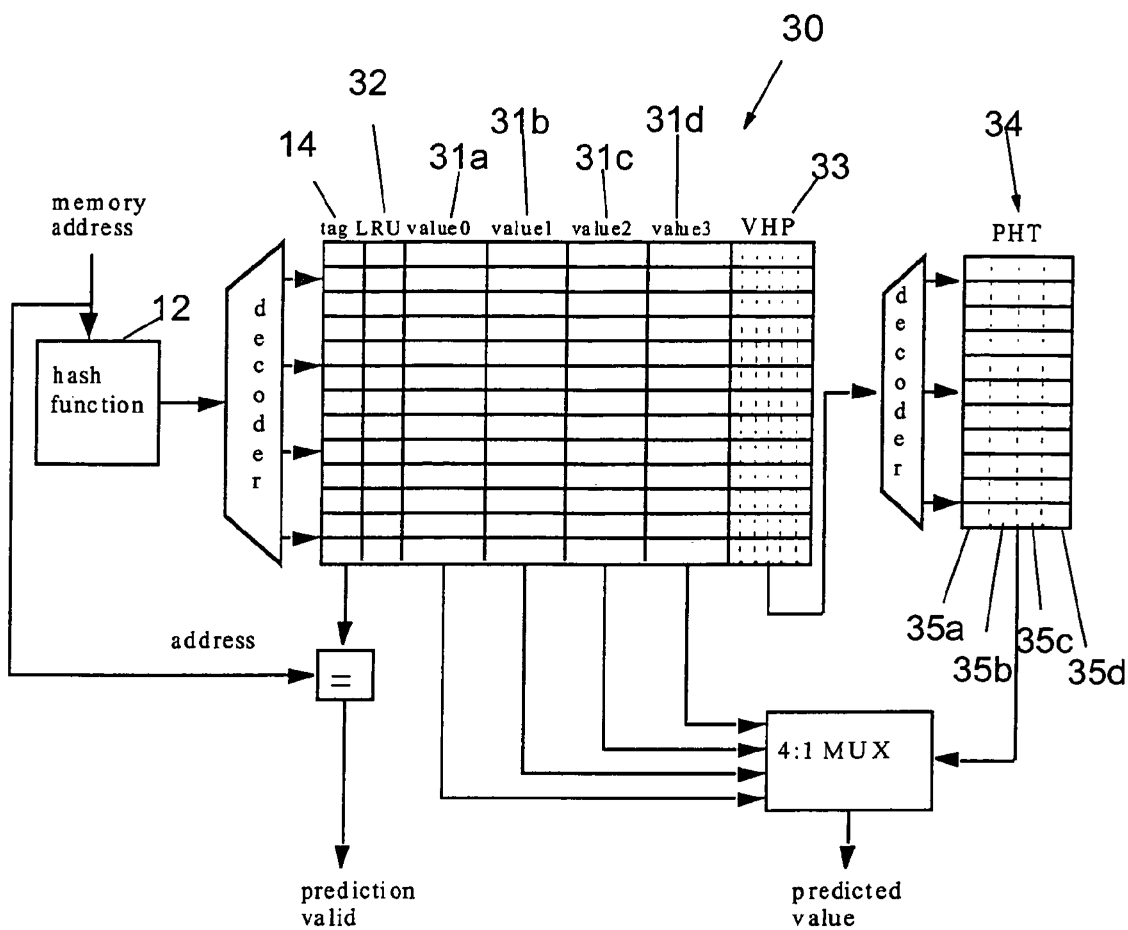
FIG. 3 is a schematic block diagram showing the essential components used in a prior art context predictor.

The two-table lookup is then executed using the stride history pattern SHP (a 12-bit pattern) as an address to select an entry in a second, so-called pattern history table 44 (PHT) having 4 K entries. An entry in this table comprises four saturating 4-bit counters. Each counter 45*a*. . . 45*d* is associated to a respective stride field 41*a*. . . 41*d* in the first table 40. The counter with the highest value and with a count higher than a particular predetermined threshold value selects the appropriate stride which is used for the prediction. This step is then executed like in the prior art—see the bottom portion of FIGS. 3 and 4, but is based uniformly on strides instead of separately evaluating values, strides and value based patterns. The predicted value is calculated by an addition of the selected stride and the last value. If the counter(s) in the PHT 44 are below said threshold value, then no prediction will be made, and thus a status 'not predictable' is granted in the respective cycle.

Next, the update and initialization procedure of the counters will be described in more detail as it reveals some important aspects of the present invention.

In order to provide a short setup time for the predictor, the number of requests to a certain table entry before a prediction for the corresponding instruction is made should be as small as possible. Thus, a particular initialization of the predictor is required.

According to a preferred embodiment of the present invention a prediction will start immediately after a new instruction is stored in the LVP/SP, i.e., the next time the instruction is hit the LVP will predict the last value.

If the last value is wrong, the current difference is stored as a stride, and the next prediction can be made using this stride. Despite that, the predictor will still predict the last value until the stride is confirmed.

Without a special initialization, the predictor according to the invention will start to predict only if at least one counter in the PHT exceeds a certain threshold value. This means that depending on the counter update procedure—comprising in turn increasing the correct PHT counter and decreasing the remaining counters—several requests to the predictor are needed before the predictor actually starts the value prediction.

In particular, when a new instruction is found and a new entry is written into the first table the current value is placed in the last value field, stride 0 into the str0 field and the LRU is initialized so that the next stride is written into str0 replacing stride 0. The SHP is initialized with the pattern '00 00 00 00 00 00' which describes a valid history for a last value/stride predictor which always uses the stride stored in str0. This pattern is unique for a LVP/SP and the corresponding counters in the PHT must be set appropriately to ensure that the prediction will use str0, i.e. the first counter is set to a value well above the threshold (e.g. to the maximum value 12) and the other counters to a value well below the threshold (e.g. =0).

Assuming that every stride field (str0, str1, str2 or str3) can be used in LVP/SP prediction, the corresponding SHP ("00 00 00 00 00 00", "01 01 01 01 01 01", "10 10 10 10 10 10" or '11 11 11 11 11 11 11") address certain counters in the PHT which can be initialized (and even fixed) appropriately. If the stride used for prediction is stored in stride field str2, the second counter of entry '101010101010' in the PHT is preset to a value well above the threshold and the remaining counters to values well below the threshold value. Accordingly, the following PHT entries can be preset (and even fixed) to the following counter values:

| SHP = PHT-address | PHT-cnt0 | PHT-cnt1 | PHT-cnt2 | PHT-cnt3 |
|---|---|---|---|---|
| 00 00 00 00 00 00 | 12 | 0 | 0 | 0 |
| 01 01 01 01 01 01 | 0 | 12 | 0 | 0 |
| 10 10 10 10 10 10 | 0 | 0 | 12 | 0 |
| 11 11 11 11 11 11 | 0 | 0 | 0 | 12 |

Thus, the step of adding a new instruction into the proposed predictor will take advantageously the following steps:

1. Step: write a new entry in the first table upon detection of new instruction:

The new entry is addressed via the hashing function. The SHP is initialized with a pattern for LVP/SP using sr0 ('00 00 00 00 00 00').

Thus, the SHP points into PHT entry '000000000000' with its counters set to: c0=12 (max), c1=c2=c3=0 (min).

Thus, the c0 counter 45*a* points to str0 field 41*a* which can be used in the next cycle for a last value prediction.

2. Step: applies if a stride not equal 0 is found: As the stride field 41*a* sr0 is used for prediction, SHP remains '00 00 00 00 00 00'

A stride of x is written into stride field 41*a*-sr0, whereas x is the difference between the current value and the last value. The next prediction then corresponds to (lastvalue+x). To ensure that the stride is written into sr0—replacing the stride 0—the LRU must be initialized accordingly as described previously.

3. Step: if no single stride is found:

The prediction still uses sr0, but no stride is stored in the empty stride field. The SHP is changed, depending on the stride field used: if str1 field 41*b* is used to store the new delta, the corresponding SHP will be '01 00 00 00 00 00'.

The corresponding counters in the PHT remain unchanged, i.e., they may have the initial values somehow below the threshold value, e.g. 3 with a threshold of 6, or the values which were already adjusted by another instruction which obeys the same stride history pattern.

If all corresponding counters in the PHT are below the threshold value no prediction will be made the next time. If a certain stride pattern is detected and confirmed, i.e., at least one counter exceeds the threshold value, predictions are made by using the stride field specified by said PHT counter with the highest value.

In this way, the prediction method of the instant invention provides an immediate response to the neutral starting conditions, as well as to the initial values of new table entries.

Figure 5:
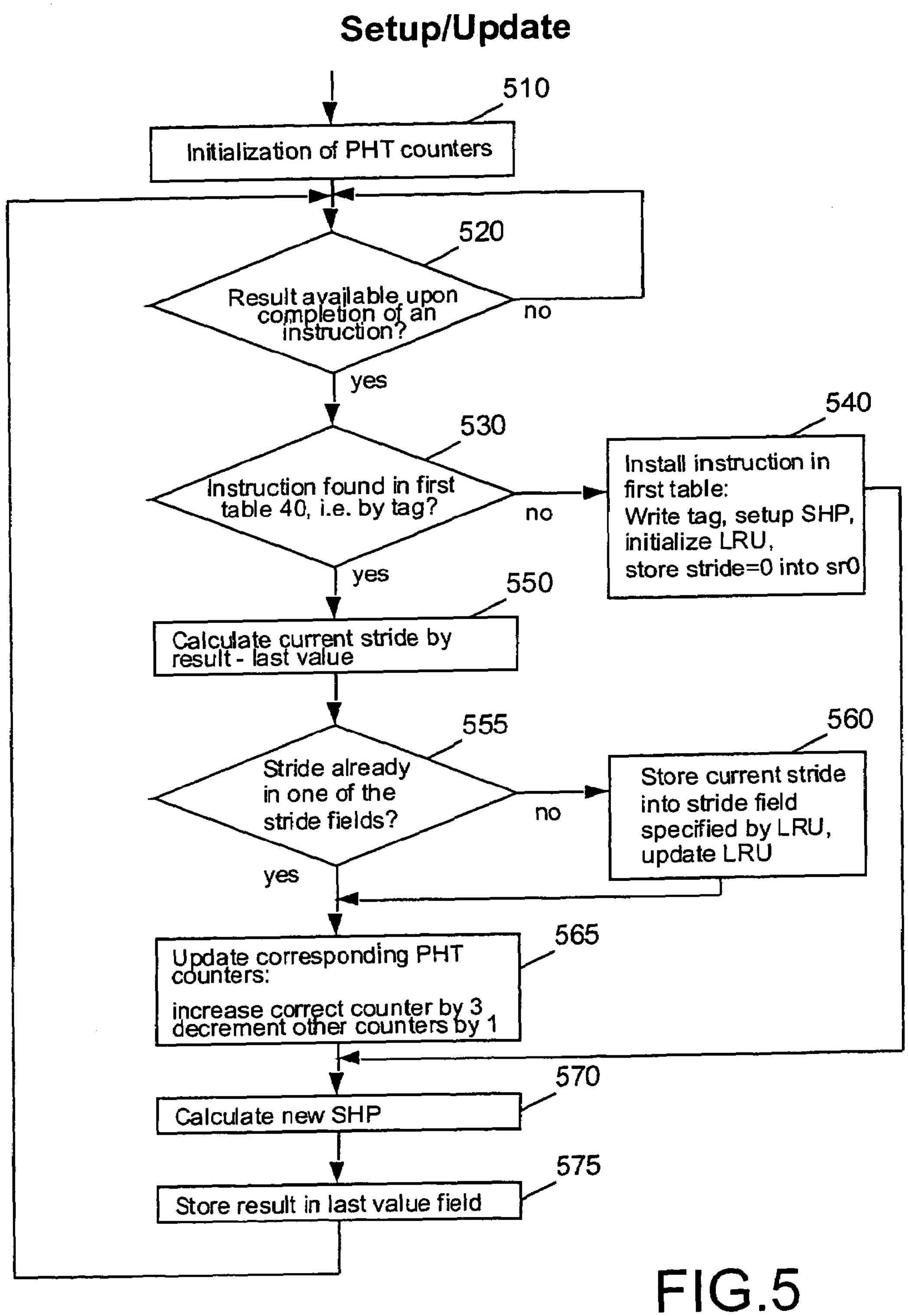
FIG. 5 is a block diagram showing basic steps and control during operation of setup and update procedure of said preferred embodiment of the present invention shown in FIG. 4.

With reference now to FIG. 5 the basic steps in the control flow during the setup of the counters and the update procedures of the relevant fields in tables 40 and 44 are described in more detail:

In a first step 510—when the program is started—all counters are initiated, i.e. setup, according to the scheme given above.

When a result is available from a newly completed instruction, see yes-branch of decision 520, it is checked see decision 530, to determine if the same instruction can be identified as present in table 40. Thus, the tag field 14 in table 40 is checked and the tag compared with the instruction address. As long as no result is available, see the no-branch of decision 520, control is fed back to repeat the check of decision 520.

In the no-branch of decision 530, i.e., when no matching entry is found, said current instruction is installed in the first table 40, see block 540. In particular, the tag field 14 is written, the SHP field 43 is setup, the LRU field 32 is initialized, and a stride of 0 is written into stride field 41*a* of the respective new entry in table 40.

Otherwise, in the yes-branch of decision 530, the current stride is calculated by subtracting the last value from the current result, see step 550.

Then, at decision 555, it is determined if the current stride can be found in one of the stride fields 41*a*, . . . 41*d*.

If not, the no-branch of decision 555 is followed and the current stride is stored into the respective stride field which is specified by the value store in the LRU field 32 and said LRU field is updated; see block 560.

In the yes-branch of 555 a current stride was already stored in one of the stride fields. Now, as well as after performing block 560, the corresponding PHT counters 45*a*, . . . 45*d* are updated, in block 565, by increasing the correct counter by 3 and decrementing the other counters by 1. It should be noted that the respective entry in table 44 is addressed by the SHP in field 43.

Then, as well as after performing block 540, the new stride history pattern is calculated as described further above, see step 570. In particular, the SHP field 43 is shifted left by two bits and the vacant bits on the right are replaced by the bit pattern corresponding to the current correct stride. If this stride is not found, the current stride is written to replace the least recently used stride field, and the corresponding 2-bit pattern is placed in the SHP 43.

Finally, the result is stored in the last value field 42, see step 575, and control is fed back to decision 520 in order to process the next instruction upon its completion.

Figure 6:
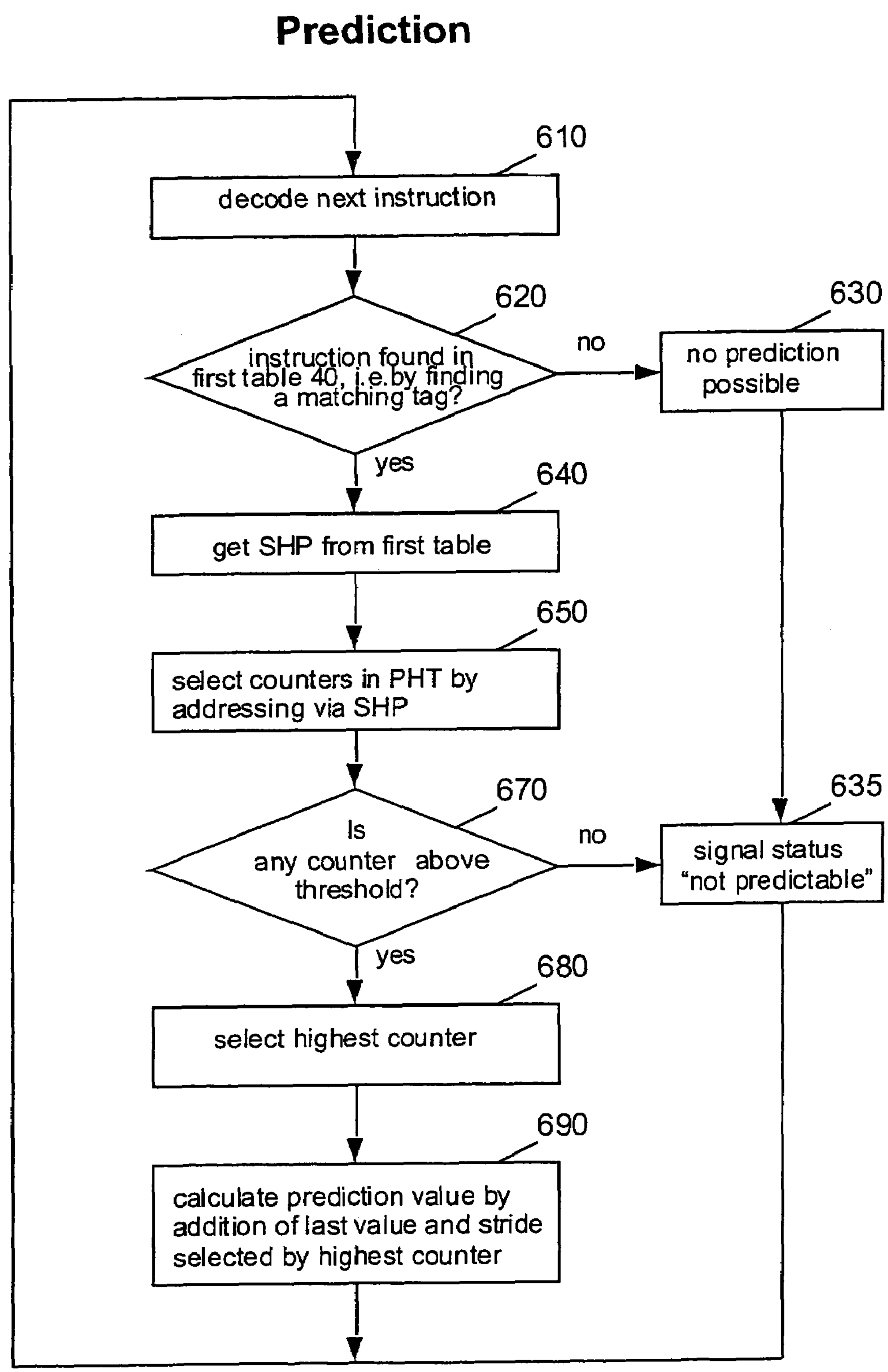
FIG. 6 is a block diagram showing basic steps and control during operation of the prediction procedure of said preferred embodiment of the present invention shown in FIG. 4.

With reference now to FIG. 6 the prediction procedure is described in more detail. It should be noted that—in the preferred embodiment—the update/setup procedures and the now described prediction procedure are implemented as independently running processes which access the same hardware arrangement by respective write (FIG. 5) and read accesses (FIG. 6), respectively.

An arbitrary instruction is treated according to the following control scheme:

In step 610, the instruction is first decoded. Then, in decision 620, it is determined if the same instruction can be identified to be present in table 40. Thus, the instruction address is compared with the tag stored in tag field 14 in table 40.

If no matching instruction is found, no prediction is possible (see block 630 ), and the status 'not predictable' is signaled to prevent an error in prediction, see step 635. Then the control is fed back to step 610, again, for decoding the next instruction.

Otherwise, if a matching instruction is found (i.e. there is a tag hit), the yes-branch of decision 620 is followed such that the stride history pattern is read from field 43 of the first table 40, see step 640. This pattern is used for selecting a respective matching entry in the second table 44 in order to evaluate and select the counter values, see step 650.

Thus, the counters and the corresponding patterns can be read and evaluated, in particular, to determine if any counter's current count is above a predetermined threshold value of, for example 6, see decision 670.

If, in the yes-branch of 670, a counter has a count of greater than the threshold value of, for example, six (6) the respective prediction can automatically be undertaken by selecting the highest counter, see step 680. This is a remarkable advantage compared to prior art which needs a complicated switching scheme in order to change from LVP to SP, and in particular from SP to CP.

Then, in a step 690 the current predicting value is calculated by adding the last value to the stride selected by the highest counter. Then, control is again fed back to step 610.

In the foregoing description the invention has been described with reference to a specific preferred embodiment thereof. It will, however, be evident that various modifications and changes may be made thereto without departing from the broader spirit and scope of the invention as set forth in the appended claims. Accordingly, the specification and drawings are to be regarded as illustrative rather than restrictive.

In particular, the dimensions of the fields given in the above preferred embodiment may be varied as required, depending on the computer processor architecture in use.

Further, the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

What is claimed is:

1. A hybrid prediction method usable in parallel computing processors for predicting a value to be produced by an anticipated execution of an instruction comprising:

storing, in a first table, a current actual value resulting from a most-recent execution of the instruction, a current stride determined from the current actual value and a previous actual value produced by a prior execution of the instruction, and a stride history pattern for the instruction, the stride history pattern representing a pattern of strides resulting from prior executions of the instruction, wherein strides, including the current stride, of the pattern of strides are stored in a stride field of the first table;

selecting a stride from the stride field of the first table; and computing a predicted value for the value to be produced by the anticipated execution of the instruction, the computing using the stride from the selecting and the current actual value, wherein the predicted value from the computing is equal to a prediction result from one of a last value prediction, a stride-based value prediction, and a stride-history-pattern-based value prediction.

2. The method according to claim 1, wherein the method further comprises:

calculating the current stride as a difference between the current actual value and another actual value resulting from an execution of the instruction prior to the most-recent execution of the instruction; and updating at least one counter of a plurality of saturating counters in a stride pattern history table according to the current stride, the plurality of saturating counters being associated with the stride history pattern.

3. The method according to claim 2, wherein:

the stride from the selecting corresponds to a counter having a count exceeding a threshold, the counter being one of the plurality of saturating counters in the stride pattern history table; and the computing further comprises adding the current actual value and the stride from the selecting.

4. The method according to claim 2, wherein the updating further comprises:

incrementing a counter of the plurality of saturating counters in the stride pattern history table, wherein the counter is associated with the current stride;

decrementing at least one other counter of the plurality of saturating counters in the stride pattern history table, wherein the at least one other counter is associated with another of the strides stored the stride field; and wherein the stride from the selecting corresponds to one of the plurality of saturating counters having a greatest count if the greatest count exceeds a threshold, and signaling to indicate that the value to be produced by the anticipated execution of the instruction cannot be predicted if none of the plurality of saturating counters has a count exceeding the threshold.

5. The method according to claim 1, wherein the method further comprises:

if an entry for the instruction from the storing is not found in the first table, initializing a plurality of saturating counters in a stride pattern history table associated with the instruction such that the predicted value from the computing is equal to the prediction result obtained from the last value prediction for a period before a comparison of the saturating counters to a threshold indicates detection of the stride history pattern; and updating at least one of the plurality of saturating counters upon a subsequent occurrence of the stride history pattern resulting from one or more subsequent executions of the instruction.

6. A hybrid prediction system usable in parallel computing processors for predicting a value to be produced by an anticipated execution of an instruction comprising:

a first table having at least one entry, each of the at least one entry comprising a current actual value resulting from a most-recent execution of an instruction, a plurality of stride fields, a stride history pattern field; and a pattern history table for storing a plurality of counters associated with the stride fields of the first table, the pattern history table being addressed by a two-table look-up mechanism using the stride history pattern field of the first table to select an entry in the pattern history table, wherein the counters are arranged for being updated according to occurrences of repeated stride patterns.

7. The hybrid prediction system according to claim 6 wherein the plurality of stride fields comprises a number of strides in a range, the range being greater than 3 and less than 7.

8. A sub-unit for use in microprocessor devices having at least one prediction system according to claim 7.

9. A microprocessor device having at least one sub-unit according to claim 8.

* * * * *